United States Patent [19]

French

[11] Patent Number: 4,631,613
[45] Date of Patent: Dec. 23, 1986

[54] THIN FILM HEAD HAVING IMPROVED SATURATION MAGNETIZATION

[75] Inventor: William W. French, Cardiff, Calif.

[73] Assignee: Eastman Kodak Company, Rochester, N.Y.

[21] Appl. No.: 600,857

[22] Filed: Apr. 16, 1984

[51] Int. Cl.$^4$ .......................... G11B 5/12; G11B 5/20
[52] U.S. Cl. ..................................... 360/125; 360/122
[58] Field of Search ............... 360/119, 120, 122, 125, 360/126, 110; 29/603; 148/31.55

[56] References Cited

U.S. PATENT DOCUMENTS

| | | | |
|---|---|---|---|
| 3,566,045 | 2/1971 | Paine | 179/100.2 |
| 3,700,827 | 10/1972 | Nagao | 179/100.2 C |
| 3,846,841 | 11/1974 | Lazzari et al. | 360/121 |
| 3,987,485 | 10/1976 | Sugaya et al. | 360/63 |
| 4,103,315 | 7/1978 | Hempstead et al. | 360/110 |
| 4,177,089 | 12/1979 | Bankson | 148/31.55 |
| 4,219,853 | 8/1980 | Albert et al. | 360/103 |
| 4,589,042 | 5/1986 | Anderson et al. | 360/125 |

FOREIGN PATENT DOCUMENTS

| | | | |
|---|---|---|---|
| 131716 | 1/1985 | European Pat. Off. | 29/603 |
| 53-7313 | 1/1978 | Japan | 360/125 |
| 57-66522 | 4/1982 | Japan | 29/603 |
| 57-162116 | 10/1982 | Japan | 29/603 |
| 58-1820 | 1/1983 | Japan | 360/110 |
| 58-77017 | 5/1983 | Japan | 29/603 |
| 59-24422 | 2/1984 | Japan | 360/122 |
| 59-135614 | 8/1984 | Japan | 29/603 |

OTHER PUBLICATIONS

Bozorth, Ferromagnetism, 1951, pp. 96–99.

*Primary Examiner*—Stuart N. Hecker
*Assistant Examiner*—Benjamin E. Urcia
*Attorney, Agent, or Firm*—Robert F. Cody

[57] ABSTRACT

It has been found that, if a (negative) bias is applied to a substrate during the sputtering thereto of Alfesil, selective re-sputtering from the substrate film of aluminum and silicon will leave that film rich in iron and, attendantly, of higher saturation magnetization (17,000 gauss) than the starting material Alfesil (10,000 gauss). Such being the case, the invention provides that the sputtering of Alfesil-type material during the manufacture of a magnetic head be performed in two phases, first, while applying a bias of a first sense to a substrate to be sputtered upon, and, second, while applying a bias of different sense (e.g. a zero bias) to the substrate, thereby to cause a composite thin film to be formed on the substrate. The composition of the thin film in question is: 1. a (generally thin) region of material of high saturation magnetization layered with 2. a (generally thicker) region of lesser saturation magnetization.

10 Claims, 4 Drawing Figures

THIN FILM HEAD HAVING IMPROVED SATURATION MAGNETIZATION

BACKGROUND OF THE INVENTION

1. Field of the Invention

This invention relates in general to magnetic heads, and more particularly to thin film magnetic heads and manufacturing methods therefor.

2. Description Relative to the Prior Art

Thin film magnetic heads have come into prominence because of their potential for manufacturing ease, especially in connection with the manufacture of high density multitrack heads. A thin film head is, typically, made by depositing a gap-defining non-magnetic film atop a magnetic substrate; then depositing a coil structure atop the non-magnetic film; and then depositing a magnetic film atop the coil structure. In the case of a thin film head used for, say, both recording and playback of video signals—or in the case of a thin film head used for microgap recording as taught in U.S. Pat. No. 4,302,790—a problem can arise depending on the coercivity of the recording medium with which the head in question is employed. For a high coercivity medium, the level of record flux may be in excess of the flux level at which the head poles magnetically saturate, thereby undesirably increasing the effective length of the head gap. U.S. patent application No. 374,665, assigned to the assignee hereof, and now abandoned, teaches that lining a transducer gap with high saturation material tends to preclude pole tip saturation; and it is to this technique that the invention is, perhaps, best compared.

Thin films as employed in connection with magnetic heads may be provided by a variety of techniques, most common of which is by sputtering. Sputtering, as is known, is a process by which ionic bombardment of a target results in the desired deposition of a thin film of target material upon a substrate. A mechanically hard, but magnetically soft, material which has found wide use in magnetic heads is the material known as Alfesil (also called Sendust), comprised of an alloy of iron, silicon, and aluminum. Alfesil—as target material—has been successfully sputtered; and has therefore been employed in the fabrication of thin film magnetic heads.

Given the tendency of closely spaced—and extremely thin—head poles to saturate while recording in a medium of high coercivity, it would be desirable to adapt the technique of abandoned U.S. patent application No. 374,665 to a thin film magnetic head comprised of Alfesil. Whereas the teaching of abandoned U.S. patent application No. 374,665 provides that a lining of Alfesil (or the like) be applied "in gap" to ferrite pole tips to lessen the chance of saturation of the ferrite pole tips, the present invention, as will appear below, calls for the modification of a thin film—during its formation—so as to cause that part of the thin film nearest the transducer gap of the head to exhibit greater saturation magnetization than other parts of the thin film. Such a technique would, therefore, have applicability both to the head of abandoned U.S. patent application No. 374,665, as well as to a thin film head as taught herein.

It has been found that, if a (negative) bias is applied to a substrate during the sputtering thereto of Alfesil, selective re-sputtering from the substrate film of aluminum and silicon will leave that film rich in iron and, attendantly, of higher saturation magnetization (17,000 gauss) than the starting material Alfesil (10,000 gauss). Such being the case, the invention provides that the sputtering of Alfesil-type material during the manufacture of a magnetic head be performed in two phases, first, while applying a bias of a first sense to a substrate to be sputtered upon, and, second, while applying a bias of different sense (e.g. a zero bias) to the substrate, thereby to cause a composite thin film to be formed on the substrate.

SUMMARY OF THE INVENTION

The composition of a thin film according to the invention is: 1. a (generally thin) region of material of high saturation magnetization layered with 2. a (generally thicker) region of lesser saturation magnetization.

The invention will now be described in detail with reference to the figures of which FIG. 1 is a schematic showing illustrating a thin film head according to the invention, FIG. 2 depicts a set of hysteretic curves useful in describing the invention, FIG. 3 is a schematic diagram of a sputtering system useful in the practice of the invention, and FIG. 4 depicts a set of timing diagrams useful in describing the workings of FIG. 3.

DETAILED DESCRIPTION OF THE INVENTION

Figure 1:
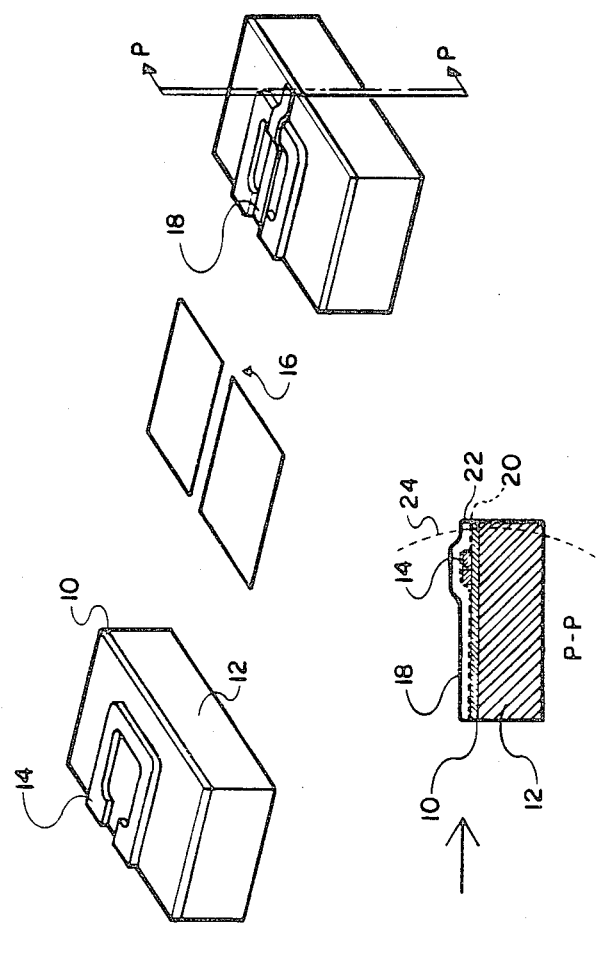

Referring to FIG. 1, a (not-to-scale) thin film head is typically formed by depositing a thin film 10 of nonmagnetic gap spacer material, e.g. $SiO_2$, upon a magnetic support 12, typically of ferrite material. Thereafter, an electrically conductive coil member 14 is formed, by deposition, upon the nonmagnetic spacer material 10. By use of a suitable mask 16, which typically is comprised of photoresist, a magnetic pole piece 18 (two microns thick) is then formed atop the head parts 10, 14. Pursuant to the invention, the magnetic pole piece member 18 has a first high saturation magnetization region 20 (0.5 microns thick) that is proximate the gap spacer material 10, and a second lower saturation magnetization region 22 (1.5 microns thick). Having formed the magnetic pole piece 18, the structure of FIG. 1 is then encapsulated and contoured (24) for coaction with magnetic media.

Figure 2:
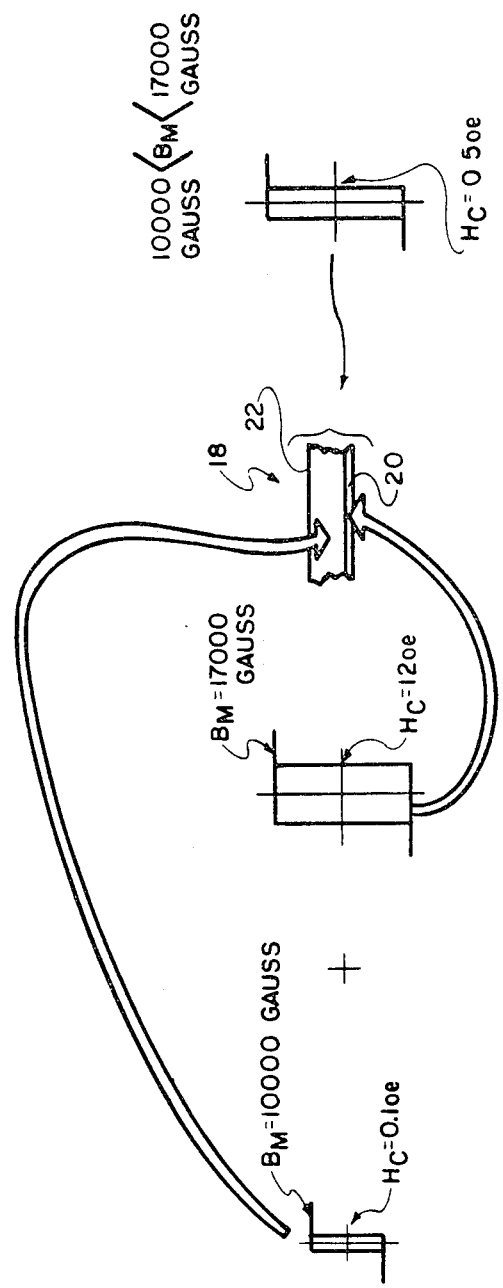

As depicted in FIG. 2, the region 20 of the magnetic pole piece member 18—which region is formed, according to the invention, to be rich in iron—has a saturation magnetization of about 17,000 gauss, and a coercivity of about 12 oersteds. By contrast, the region 22 of the magnetic pole piece member 18 has a saturation magnetization of only 10,000 gauss, albeit that its coercivity is (desirably) only about 0.1 oersteds. Coaction between the two regions 20, 22 of the magnetic pole piece member 18 has the effect of significantly increasing the aggregated saturation magnetization of the magnetic pole piece member 18, while just marginally increasing the overall coercivity of the member 18 to 0.5 oersteds.

Figure 3:
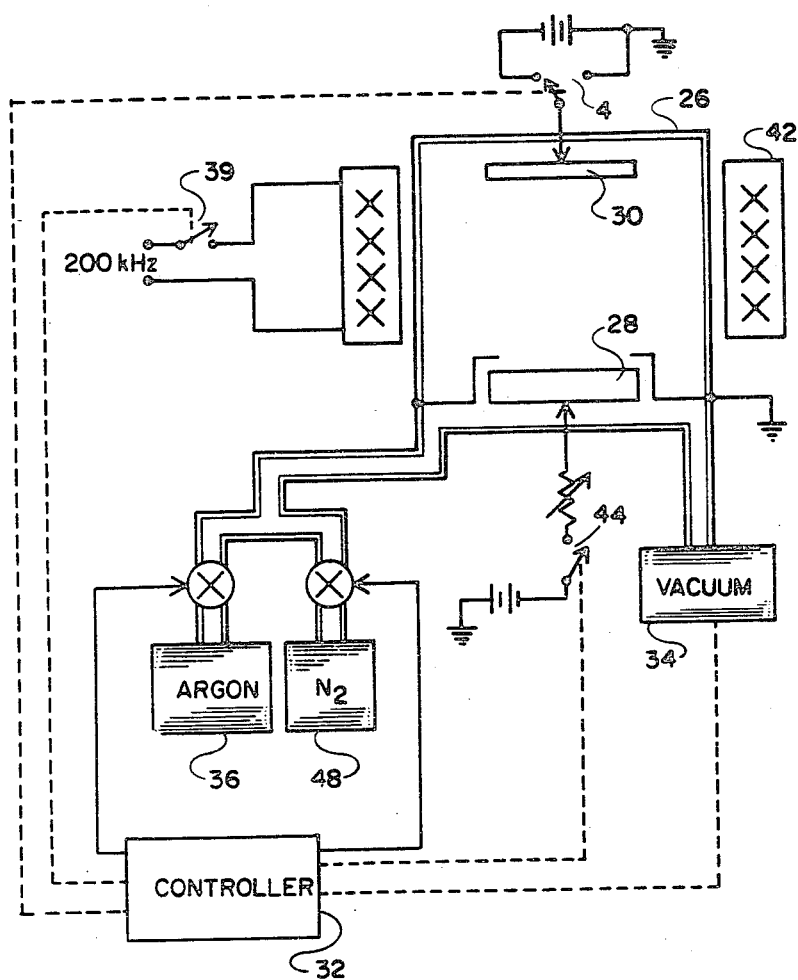
Figure 4:
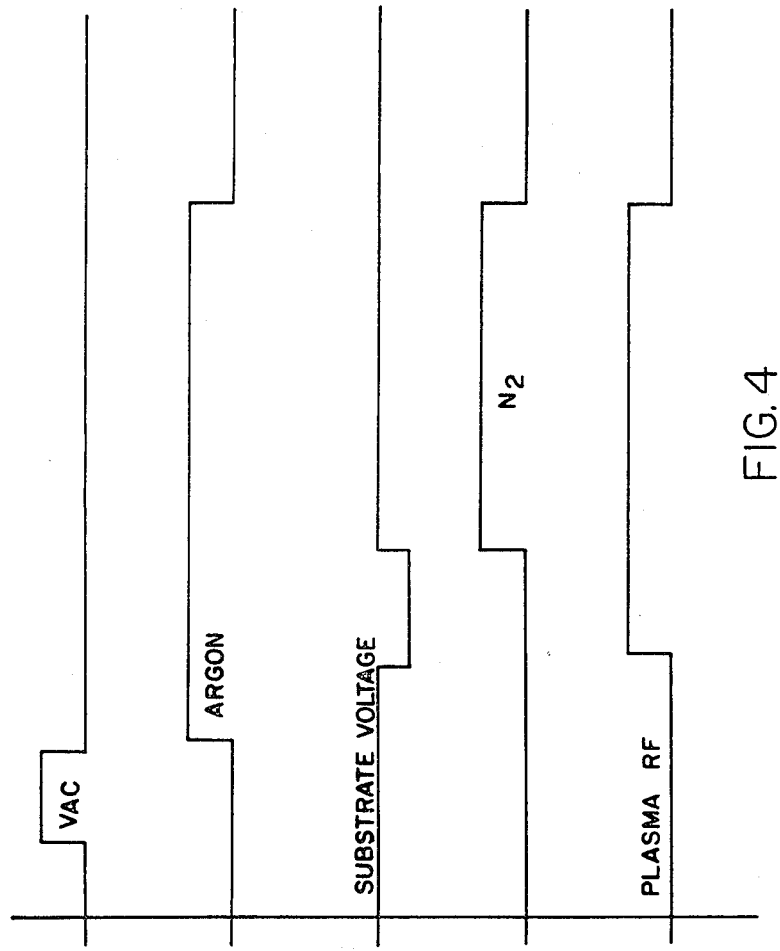

To produce a thin film having the magnetic characteristics of the magnetic pole piece member 18, a sputtering operation as depicted in FIG. 3 is employed. With reference to FIG. 3, a sputtering chamber 26 is adapted to contain Alfesil target material 28 and a substrate 30 (e.g. a ferrite slab that is coated with gap spacer material), upon which a sputtered thin film according to the invention is to be deposited. Under control of a controller 32 (which may be a microprocessor, or a set of motor driven actuators, or simply a human operator, etc.), a vacuum 34 is turned on (FIG. 4) to clear ($2 \times 10^{-6}$ torr) the sputtering chamber 26. Thereafter, under control of the controller 32, argon gas (36) is introduced to the sputtering chamber 26 (pressure: $2 \times 6^{-3}$ torr); after which an argon plasma is produced (switch 39) by a coil 42 surrounding the sputtering chamber 26. The coil 42, which is excitable by a 200 kHz radio frequency signal, is sufficiently large axially to maintain the argon plasma in the vicinity of the substrate 30. Particle bombardment of the substrate is important to the practice of the invention; but such bombardment may be achieved by a variety of other techniques as well (e.g. by use of an ion gun).

The Alfesil target is disposed for negative biasing (switch 44) at (1,000 volts); and the substrate is disposed for either (switch 46) negative biasing (60 volts), or for being grounded.

Nitrogen (48) may be selectively introduced to the sputtering chamber 26, as will be discussed below.

Given that the Alfesil target 28 and substrate 30 are in place, and that an argon plasma has been formed within the sputtering chamber 26, both the target 28 and the substrate 30 are biased negatively (at least initially). Attendantly, a film of Alfesil starts to get deposited on the gap spacer material of the substrate 30 and, as this happens, selective re-sputtering of silicon and aluminum from the "starter" film occurs. This, then, leaves the "starter" film rich in iron and, attendantly, of comparatively high saturation magnetization (17,000 gauss).

Having suitably structured that region (20, FIG. 2) of the thin film pole piece 18 which is proximate the gap spacer material of the substrate 30, the substrate bias is switched to ground thereby to build up the region 22 (saturation magnetization: 10,000 gauss) of the pole piece 18. During the time that the film region 22 is being formed (FIG. 4), it has been found convenient to introduce nitrogen (source 48) to the sputtering chamber 26, thereby to convert what would otherwise be a low permeability crystalline film to a high permeability amorphous one. (An alternate to the introduction of nitrogen to the sputtering chamber 26, incidentally, is to anneal the crystalline film after its formation, thereby to increase its permeability.) Thereafter, the plasma is terminated (switches 37a, b, 39); the bias is removed (switches 44, 46); and the sputtering chamber 26 vented, thereby to ready the chamber 26 for another sputtering operation.

By means of the procedures described above, a new form of thin film magnetic head is provided: a head in which (at least) one pole piece thereof is comprised of a sputtered Alfesil-like film having improved saturation magnetization to about 17,000 gauss.

The invention has been described in detail with particular reference to certain preferred embodiments thereof, but it will be understood that variations and modifications can be effected within the spirit and scope of the invention. For example, it would be within the scope of the invention to deposit upon a slab (magnetic or otherwise) a first pole piece film of Alfesil; then to bias the slab to effect re-sputtering to increase the saturation magnetization of the first pole piece film; then to deposit gap spacer material; and then to form a second pole piece film as described above. Further, although the above teaching calls for the use of discrete biases to be applied to the substrate to be sputtered upon, a graduated change from one bias sense to another may be employed to change gradually the saturation magnetization as a function of depth into the film being structured.

What is claimed is:

1. A thin film magnetic head for recording in and/or reproducing from a magnetic recording medium, said head comprising
   (a) means defining first and second magnetic poles, and
   (b) means defining a nonmagnetic transducer gap between said poles, at least one of said magnetic poles being comprised of a thin film of an alloy of silicon, aluminum and iron, said alloy being richer in iron in that portion thereof which is in proximity to said transducer gap than that portion which is distal with respect thereto, said thin film being so disposed with respect to said head that both said proximate and distal portions reside at the same distance from said medium when said head is in use.

2. The magnetic head of claim 1 wherein said thin film has an aggregated saturation magnetization that is between 10,000 gauss and 17,000 gauss depending on the graded concentration of iron in said film.

3. The magnetic head of claim 2 wherein said thin film has an overall coercivity of between 0.1 oersteds and 12 oersteds.

4. The magnetic head of claim 2 wherein said thin film is an amorphous one of approximately two microns thick.

5. The magnetic head of claim 2 wherein the graded concentration of iron in said thin film substantially continuously changes as a function of thickness of said thin film.

6. In a magnetic head for recording in and/or reproducing from a magnetic recording medium, said head being comprised of first and second magnetic pole defining means and a thin film nonmagnetic gap spacer means therebetween, the improvement wherein at least one of said pole defining means is a thin film of an alloy of silicon, aluminum and iron, and wherein said alloy film has a greater concentration of iron in that portion of said film which is in proximity to said thin film nonmagnetic gap spacer means than in that portion of said film which is distal with respect thereto, said thin film being so disposed with respect to said head that both said proximate and distal portions reside at the same distance from said medium when said head is in use.

7. In the improved magnetic head of claim 6, the further improvement wherein said alloy thin film has a saturation magnetization in the aggregate which is between 10,000 gauss and 17,000 gauss depending on the graded concentration of iron in said alloy thin film.

8. In the improved magnetic head of claim 7, the further improvement wherein said alloy thin film has a coercivity of between 0.1 oersteds and 12 oersteds.

9. In the improved magnetic head of claim 6, the further improvement wherein said alloy thin film is an amorphous one.

10. In the improved magnetic head of claim 7, the further improvement wherein the concentration of iron in said alloy thin film varies as an inverse function of distance from said nonmagnetic spacer means.

* * * * *